United States Patent
Cho et al.

(10) Patent No.: US 12,362,429 B2
(45) Date of Patent: *Jul. 15, 2025

(54) AQUEOUS COATING COMPOSITION INCLUDING POLY(VINYLAMIDE)-BASED COPOLYMER, CROSSLINKING AGENT, AND INORGANIC PARTICLES, METHOD FOR MANUFACTURING SEPARATOR BY USING SAME, SEPARATOR, AND LITHIUM BATTERY

(71) Applicant: SAMSUNG SDI CO., LTD., Yongin-si (KR)

(72) Inventors: Minho Cho, Yongin-si (KR); Byungmin Lee, Yongin-si (KR); Hana Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/013,715

(22) PCT Filed: May 13, 2022

(86) PCT No.: PCT/KR2022/006864
§ 371 (c)(1),
(2) Date: Dec. 27, 2023

(87) PCT Pub. No.: WO2022/240225
PCT Pub. Date: Nov. 17, 2022

(65) Prior Publication Data
US 2024/0222790 A1    Jul. 4, 2024

(30) Foreign Application Priority Data
May 14, 2021 (KR) .................... 10-2021-0062749

(51) Int. Cl.
*H01M 50/446* (2021.01)
*H01M 10/052* (2010.01)
(Continued)

(52) U.S. Cl.
CPC ....... *H01M 50/446* (2021.01); *H01M 10/052* (2013.01); *H01M 50/403* (2021.01); *H01M 50/449* (2021.01); *H01M 50/491* (2021.01)

(58) Field of Classification Search
CPC ............. H01M 50/446; H01M 50/403; H01M 50/491; H01M 50/449
(Continued)

(56) References Cited

U.S. PATENT DOCUMENTS

| 6,306,545 B1 | 10/2001 | Carlson et al. |
| 2011/0027658 A1 | 2/2011 | Kim et al. |

(Continued)

FOREIGN PATENT DOCUMENTS

| JP | 4426721 B2 | 3/2010 |
| JP | 2019-525439 A | 9/2019 |

(Continued)

OTHER PUBLICATIONS

International Search Report dated Aug. 22, 2022, of the corresponding PCT Application No. PCT/KR2022/006864.
Korean Office action dated Aug. 27, 2024.

*Primary Examiner* — Sean P Cullen
(74) *Attorney, Agent, or Firm* — Lee IP Law, P.C.

(57) ABSTRACT

Provided are a composition for coating a separator, a method of preparing a separator using the same, a separator, and a lithium battery employing the separator. The composition for coating a separator includes a binder including an aqueous cross-linking reactive poly(vinylamide)-based copolymer, a cross-linker, inorganic particles, and water, wherein the poly(vinylamide)-based copolymer includes a (Continued)

repeating unit derived from a vinylamide monomer, and a repeating unit derived from a cross-linking reactive group-containing monomer. The composition for coating a separator may provide a separator having high thermal resistance characteristics.

17 Claims, 2 Drawing Sheets

(51) Int. Cl.
  *H01M 50/403* (2021.01)
  *H01M 50/449* (2021.01)
  *H01M 50/491* (2021.01)

(58) Field of Classification Search
  USPC .................................. 429/144, 251, 254
  See application file for complete search history.

(56) References Cited

U.S. PATENT DOCUMENTS

| | | |
|---|---|---|
| 2012/0003524 A1 | 1/2012 | Jo et al. |
| 2015/0221916 A1 | 8/2015 | Lee et al. |
| 2016/0190537 A1 | 6/2016 | Park et al. |
| 2016/0204409 A1* | 7/2016 | Jeon ................... H01M 50/489 |
| | | 429/145 |
| 2017/0173927 A1 | 6/2017 | Park et al. |
| 2018/0019457 A1* | 1/2018 | Alharizah ........... H01M 50/491 |
| 2018/0040868 A1 | 2/2018 | Jang et al. |
| 2018/0277815 A1 | 9/2018 | Sung et al. |
| 2019/0237732 A1 | 8/2019 | Hu et al. |
| 2020/0411826 A1 | 12/2020 | Lee et al. |
| 2022/0006156 A1 | 1/2022 | Kim et al. |
| 2024/0250384 A1* | 7/2024 | Gu ...................... H01M 50/403 |

FOREIGN PATENT DOCUMENTS

| | | | |
|---|---|---|---|
| KR | 10-1117126 B1 | 2/2012 | |
| KR | 10-1125013 B1 | 3/2012 | |
| KR | 10-2012-0108686 | 10/2012 | |
| KR | 2012108686 A * | 10/2012 | ......... H01M 50/403 |
| KR | 10-1256968 B1 | 4/2013 | |
| KR | 10-2013-0052406 A | 5/2013 | |
| KR | 10-1288650 B1 | 7/2013 | |
| KR | 10-2015-0073615 A | 7/2015 | |
| KR | 10-1551757 B1 | 9/2015 | |
| KR | 10-1749878 B1 | 6/2017 | |
| KR | 10-2017-0108063 A | 9/2017 | |
| KR | 2017108063 A * | 9/2017 | ............. C04B 14/02 |
| KR | 10-1989533 B1 | 6/2019 | |
| KR | 10-2018299 B1 | 11/2019 | |
| KR | 10-2019-0141082 A | 12/2019 | |
| KR | 10-2072763 B1 | 3/2020 | |
| KR | 10-2020-0130134 A | 11/2020 | |
| KR | 2020130134 A * | 11/2020 | ......... H01M 10/052 |
| WO | WO-2015046126 A1 * | 4/2015 | ............. H01M 2/166 |

* cited by examiner

AQUEOUS COATING COMPOSITION INCLUDING POLY(VINYLAMIDE)-BASED COPOLYMER, CROSSLINKING AGENT, AND INORGANIC PARTICLES, METHOD FOR MANUFACTURING SEPARATOR BY USING SAME, SEPARATOR, AND LITHIUM BATTERY

CROSS REFERENCE TO RELATED APPLICATIONS

This is the U.S. national phase application of PCT/KR2022/006864, filed May 13, 2022, which is based on Korean Patent Application No. 10-2021-0062749, filed May 14, 2021, the entire contents of all of which are hereby incorporated by reference.

TECHNICAL FIELD

The present disclosure relates to a composition for coating a separator, a method of preparing a separator by using the same, a separator, and a lithium battery employing the separator.

BACKGROUND ART

In accordance with the emergence of various miniaturized, high-performance electronic devices, miniaturization and weight reduction are becoming more important in the field of lithium batteries. In addition, discharge capacity, energy density, and cycle characteristics of lithium batteries are becoming important in order to be applied in fields such as electric vehicles. In order to meet the above needs, a lithium battery having high discharge capacity per unit volume, high energy density, and excellent lifespan characteristics is required.

In a lithium battery, a separator is arranged between a positive electrode and a negative electrode to prevent a short circuit. An electrode assembly including a positive electrode, a negative electrode, and a separator arranged between the positive electrode and the negative electrode is wound to have a jelly roll shape, and in order to improve an adhesive force between the positive/negative electrode and the separator in the electrode assembly, the jelly roll is roll-pressed.

Olefin-based polymers are widely used as separators for lithium batteries. Olefin-based polymers have excellent flexibility, but have low strength in case immersed in a liquid electrolyte, and may cause a short circuit of a battery due to rapid thermal shrinkage at a high temperature of 100° C. or higher. In order to solve this issue, for example, a separator having a shutdown function added by using polyethylene wax on a porous olefin-based polymer substrate has been proposed. However, the polyethylene wax-coated separator does not maintain the coating layer at a high temperature because the polyethylene wax dissolves, and thus, a contact area of an electrode plate increases and thermal runaway increases.

Therefore, a separator capable of improving battery stability at high temperatures is required.

DESCRIPTION OF EMBODIMENTS

Technical Problem

An aspect is to provide a composition for coating a separator having high thermal resistance characteristics.

Another aspect is to provide a method of preparing a separator using the composition.

Still another aspect is to provide a separator prepared by the above preparing method.

Still another aspect is to provide a lithium battery including the separator.

Solution to Problem

According to an aspect, provided is a composition for coating a separator including:
a binder including an aqueous cross-linking reactive poly(vinylamide)-based copolymer; a cross-linker; inorganic particles; and water, wherein
the poly(vinylamide)-based copolymer includes a repeating unit derived from a vinylamide monomer and a repeating unit derived from a cross-linking reactive group-containing monomer.

According to another aspect, provided is a method of preparing a separator, including:
coating the composition for coating a separator on one surface or both surfaces of a porous substrate; and
drying the porous substrate coated with the composition with hot air to obtain a separator having a coating layer arranged on the porous substrate.

According to still another aspect, provided is a separator, including:
a porous substrate; and
a coating layer including a dried cross-linked product of the composition for coating a separator, arranged on one surface or both surfaces of the porous substrate.

According to still another aspect, provided is a lithium battery including the separator.

Advantageous Effects of Disclosure

A composition for coating a separator according to an aspect may produce a separator having high thermal resistance.

BEST MODE

Figure 1:
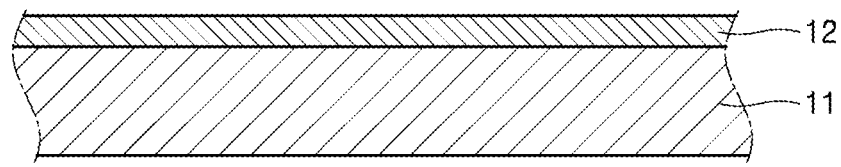
FIG. 1 is a schematic cross-sectional view of a separator according to an example embodiment.

The present inventive concept described hereinafter may be modified in various ways, and may have many examples, and thus, certain examples are illustrated in the drawings, and are described in detail in the specification. However, this does not intend to limit the present inventive concept within particular embodiments, and it should be understood that the present disclosure includes all the modifications, equivalents, and replacements within the technical scope of the present inventive concept.

Terms used herein were used to describe particular examples, and not to limit the present inventive concept. As used herein, the singular of any term includes the plural, unless the context otherwise requires. The expression of "include" or "have", used herein, indicates an existence of a characteristic, a number, a phase, a movement, an element, a component, a material, or a combination thereof, and it should not be construed to exclude in advance an existence or possibility of existence of at least one of other characteristics, numbers, movements, elements, components, materials, or combinations thereof. As used herein, "/" may be interpreted to mean "and" or "or" depending on the context.

In the drawings, a thickness is enlarged or reduced to clearly represent various layers and regions. The same reference numerals were attached to similar portions throughout the disclosure. As used herein throughout the disclosure, when a layer, a membrane, a region, or a plate is described to be "on" or "above" something else, it not only includes the case in which it is right above something else but also the case when other portion(s) are present in-between. Terms like "first", "second", and the like may be used to describe various components, but the components are not limited by the terms. The terms are used merely for the purpose of distinguishing one component from other components.

In this specification, a reference to any monomer(s) generally refers to a monomer that may be polymerized with another polymerizable component, such as another monomer or polymer. It is to be understood that, unless otherwise indicated, once a monomeric component reacts with another component to form a compound, the compound will contain a residue of such a component.

The term "polymer", used herein, is intended to refer to prepolymers, oligomers, homopolymers, copolymers, and blends or mixtures thereof.

The expression "combination thereof", used herein, may mean a mixture of constituents, copolymers, blends, alloys, composites, reaction products, and the like.

Hereinafter, a composition for coating a separator according to example embodiments, a method of preparing a separator by using the same, a separator, and a lithium battery employing the separator will be described in more detail.

According to an aspect, a composition for coating a separator includes:
  a binder including an aqueous cross-linking reactive poly(vinylamide)-based copolymer; a cross-linker; inorganic particles; and water, wherein
  the poly(vinylamide)-based copolymer includes a repeating unit derived from a vinylamide monomer and a repeating unit derived from a cross-linking reactive group-containing monomer.

The composition for coating a separator provides a separator in which a coating layer is formed by coating on one surface or both surfaces of a porous substrate. A separator having higher thermal resistance as compared to existing separators in the art may be prepared by using the composition for coating a separator. The separator prepared by using the composition may improve stability and lifespan characteristics of a lithium battery.

The composition for coating a separator includes: a binder including an aqueous cross-linking reactive poly(vinylamide)-based copolymer; a cross-linker; inorganic particles; and water, wherein the poly(vinylamide)-based copolymer includes a repeating unit derived from a vinylamide monomer and a repeating unit derived from a cross-linking reactive group-containing monomer. The composition for coating a separator may cause a cross-linking reaction of the repeating unit derived from the cross-linking reactive group-containing monomer in the poly(vinylamide)-based copolymer by the cross-linker. Through this, a coating layer of a separator may be formed, and a separator having higher thermal resistance characteristics than existing separators may be provided.

According to an example, the vinylamide monomer may be selected from vinylpyrrolidone, vinylcaprolactam, N-vinylformamide, N-vinylacetamide, N-vinyl-N-methylacetamide, and mixtures thereof. For example, the vinylamide monomer may be vinylpyrrolidone.

According to an example, the cross-linking reactive group may include at least one selected from a carboxyl group, an amine group, an isocyanate group, a hydroxyl group, an epoxy group, and an oxazoline group. For example, the cross-linking reactive group may include a carboxyl group.

The monomer containing the cross-linking reactive group may be a monomer containing a carboxyl group. For example, the carboxyl group may be selected from acrylic acid, methacrylic acid, carboxyethyl acrylate, carboxypentyl acrylate, itaconic acid, maleic acid, fumaric acid, crotonic acid, and isocrotonic acid; monovalent metal salts, divalent metal salts, ammonium salts, and organic amine salts thereof; and mixtures thereof. For example, the monomer containing cross-linking reactive group may be acrylic acid, methacrylic acid, or a mixture thereof.

According to an example, the poly(vinylamide)-based copolymer may include a repeating unit derived from vinylpyrrolidone and a repeating unit derived from (meth)acrylic acid.

In the poly(vinylamide)-based copolymer, a content of the repeating unit derived from a cross-linking reactive group-containing monomer may be greater than 0 mol % and less than 50 mol %, for example, 1 mol % to 45 mol %, 5 mol % to 40 mol %, or 10 mol % to 30 mol %, based on total moles of the monomer components constituting the poly(vinylamide)-based copolymer. By using the poly(vinylamide)-based copolymer with a repeating unit derived from a cross-linking reactive group-containing monomer, a coated separator having high thermal resistance characteristics may be prepared through cross-linking reactions by a cross-linker.

A weight average molecular weight of the poly(vinylamide)-based copolymer may be 100,000 g/mol to 1,000,000 g/mol. For example, the weight average molecular weight of the poly(vinylamide)-based copolymer may be 150,000 g/mol to 800,000 g/mol, specifically, 200,000 g/mol to 700,000 g/mol, and more specifically, 300,000 g/mol to 600,000 g/mol. Within the range, it is possible to prepare a coated separator having a low shrinkage rate when stored at a high temperature. For example, within the above range, a coated separator having a shrinkage rate of 5% or less when stored at 150° C. for 1 hour may be prepared.

The poly(vinylamide)-based copolymer may have a glass transition temperature of 150° C. or higher. For example, the glass transition temperature of the poly(vinylamide)-based copolymer may be 150° C. to 300° C., specifically, 170° C. to 280° C., and more specifically, 190° C. to 250° C. Within the above range, a separator coating layer having high thermal resistance may be formed.

According to an example, the poly(vinylamide)-based copolymer may be aqueous cross-linking reactive polyvinylidene-acrylic acid copolymer.

A content of the poly(vinylamide)-based copolymer may be 10 wt % to 100 wt %, with respect to the total weight of the binder. For example, the content of the poly(vinylamide)-based copolymer may be 30 wt % to 95 wt %, 50 wt % to 90 wt %, or 60 wt % to 80 wt %, with respect to the total weight of the binder. Within the above range, it is possible to provide a composition for coating a separator having improved thermal resistance and moisture properties.

The composition for coating a separator may further include an aqueous binder commonly used in the art as a binder. Examples of the commonly used aqueous binder include, for example, at least one selected from polyvinyl alcohol, polyvinyl acetate, polyacrylic acid, polyacrylic acid ester, polymethacrylic acid, polymethacrylic acid ester, poly-N-vinylcarboxylic acid amide, polyacrylonitrile, polyether, polyamide, ethylene vinyl acetate copolymer, polyethylene oxide, cellulose acetate, cellulose acetate butylate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, and polyimide.

The cross-linker included by the composition for coating a separator is not particularly limited within the range that the cross-linker may form a cross-linking reaction with a cross-linking reactive group of the poly(vinylamide)-based copolymer. For example, the cross-linker may include at least one selected from ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propanediol, dipropyleneglycol, polypropyleneglycol, glycerin, polyglycerin, butanediol, heptanediol, hexanediol trimethylolpropane, pentaerythricol, and sorbitol.

A content of the cross-linker may be in a range of 1 part by weight to 45 parts by weight, with respect to 100 parts by weight of the poly(vinylamide)-based copolymer. A desired level of crosslinking may be induced within the above range, and thus a coating layer capable of exhibiting high thermal resistance may be formed.

For inorganic particles included in the composition for coating a separator, possibility of a short circuit between a positive electrode and a negative electrode is reduced by including the inorganic particles in a coating layer of a separator formed from the composition, and thereby, battery stability may be enhanced. The inorganic particles included in the composition for coating a separator may be a metal oxide, a metalloid oxide, or a combination thereof. Specifically, the inorganic particles may be alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, magnesium oxide, and the like. The inorganic particles may be, for example, $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or combinations thereof. The inorganic particles may be alumina, titania, boehmite, barium sulfate, or combinations thereof. The inorganic particles may be spherical, plate-like, fibrous, etc., but are not limited thereto, and any form that may be used in the art may be used. Plate-like inorganic particles include, for example, alumina and boehmite. In this case, reduction of a separator area at a high temperature may be further suppressed, relatively large porosity may be secured, and characteristics of a lithium battery may be improved during penetration evaluation. In case the inorganic particles are plate-like or fibrous, the inorganic particles may have an aspect ratio of about 1:5 to about 1:100. For example, the aspect ratio may be about 1:10 to about 1:100. For example, the aspect ratio may be about 1:5 to about 1:50. For example, the aspect ratio may be about 1:10 to about 1:50. On a flat surface of plate-like inorganic particles, a ratio of long-to-short axis may be 1 to 3. For example, on the flat surface, a long-to-short axis ratio may be 1 to 2. For example, on the flat surface, a long-to-short axis ratio may be about 1. The aspect ratio and long-to-short axis ratio may be measured by using a scanning electron microscope (SEM). Within the ranges of the aspect ratio and the long-to-short axis ratio, shrinkage of the separator may be suppressed, relatively improved porosity may be secured, and penetration characteristics of a lithium battery may be improved. In case the inorganic particles are in a form of a plate, an average angle of the flat surface of the inorganic particles with respect to one surface of a porous substrate may be 0 degrees to 30 degrees. For example, the angle of the flat surface of the inorganic particles with respect to one surface of the porous substrate may converge to 0 degree. That is, one surface of the porous substrate and the flat surface of the inorganic particles may be parallel. For example, in case the average angle of the flat surface of the inorganic compound with respect to one surface of the porous substrate is within the above range, thermal shrinkage of the porous substrate may be effectively prevented, and a separator with a reduced shrinkage rate may be provided.

In the composition for coating a separator, a weight ratio of a total weight of the binder to a weight of the inorganic particles may be 0.1:99.9 to 50:50. For example, the weight ratio of the total weight of the binder to the weight of the inorganic particles may be 1:99 to 20:80, or 3:97 to 30:70. Within the range, it is possible to provide a composition for coating a separator having excellent substrate binding ability and excellent thermal resistance.

The composition for coating a separator may further include organic particles. Organic particles may be cross-linked polymers. Organic particles may be highly cross-linked polymers showing no glass transition temperature (Tg). In case a highly cross-linked polymer is used, thermal resistance is improved and shrinkage of the porous substrate at high temperatures may be effectively suppressed. Organic particles may include, for example, styrene-based compounds and derivatives thereof, methyl methacrylate-based compounds and derivatives thereof, acrylate-based compounds and derivatives thereof, diallyl phthalate-based compounds and derivatives thereof, polyimide-based compounds and derivatives thereof, polyurethane-based compounds and derivatives thereof, copolymers thereof, or combinations thereof, but are not limited thereto, and any material that may be used as organic particles in the art may be used. For example, the organic particles may be cross-linked polystyrene particles, or cross-linked polymethyl methacrylate particles. The particles may be secondary particles formed by aggregation of primary particles. In a separator including secondary particles, porosity of a coating layer is increased, and thus, a lithium battery having excellent high output characteristics may be provided.

The composition for coating a separator may be provided in a form of slurry, by including water as a solvent capable of dispersing the above-described components. The composition for coating a separator may further include an organic solvent as long as the aqueous characteristics are not impaired. The organic solvent may be an alcohol-based organic solvent. For example, the organic solvent may include at least one selected from the group consisting of methanol, ethanol, propanol, and butanol. By using an alcohol-based organic solvent, it is possible to provide a composition for coating a separator that is harmless to the body and has excellent drying characteristics, thereby securing mass productivity without reducing productivity.

According to an example, the water and organic solvent may be included in a volume ratio of 100:0 to 60:40. For example, the water and organic solvent may be included in a volume ratio of 95:5 to 80:20, specifically, for example, may be included in a volume ratio of 85:15 to 70:30. Within the above range, it is possible to provide a composition for coating a separator having enhanced drying characteristics.

The solvent is volatilized through drying after coating with the composition for coating a separator, and thus, the solvent does not exist in the finally obtained coating layer of the separator.

A method of preparing a separator according to an embodiment includes: coating the composition for coating a separator on one surface or both surfaces of a porous substrate; and drying the porous substrate coated with the composition for coating a separator with hot air to obtain a separator having a coating layer arranged on the porous substrate.

First, the composition for coating a separator is coated on one surface or both surfaces of the porous substrate while moving the porous substrate.

A method of coating the composition for coating a separator on one surface or both surfaces of the moving porous substrate is not particularly limited, and for example, at least one selected from a forward roll coating method, a reverse roll coating method, a microgravure coating method, and a direct metering coating method may be used, but is not necessarily limited to these methods. The coating method may be, for example, a direct metering coating method.

Subsequently, the porous substrate coated with the composition for coating a separator is moved into a dryer.

In the dryer, the porous substrate coated with the composition for coating a separator is dried with hot air, and thus, a separator with a coating layer arranged on the porous substrate is prepared. The porous substrate coated with the composition for coating a separator is fed to the dryer from one side, dried by hot air in the dryer, and then discharged from the other side of the dryer. In the dryer, hot air is supplied from upper nozzles and lower nozzles arranged alternately or symmetrically on upper and lower portions of the porous substrate coated with the composition for coating a separator.

A moving speed of the porous substrate in the dryer may be the same as a coating speed. In case the moving speed of the porous substrate is too slow, inorganic particles included in the composition for coating a separator are mainly distributed at an interface between the coating layer and the porous substrate, and thus, binding force between the coating layer and the porous substrate may decrease. In case the moving speed of the porous substrate is too fast, the inorganic particles in the coating layer are mainly distributed near the surface of the coating layer facing the electrode, and thus, binding force between the separator and the electrode may decrease.

A hot air supply rate in the dryer may be, for example, 10 m/s to 50 m/s, 10 m/s to 40 m/s, 10 m/s to 30 m/s, or 10 m/s to 20 m/s, and a drying completion rate may be greater than 15 mpm. By having a hot air supply rate and drying completion rate within the ranges, a production speed may be enhanced, and a separator in which bending strength and peel strength are improved at the same time may be prepared. In case the hot air supply rate is too low, the inorganic particles included in the composition for coating a separator are mainly distributed at an interface between the coating layer and the porous substrate, and thus, binding force between the coating layer and the porous substrate may decrease. In case the hot air supply rate is too high, the inorganic particles in the coating layer are mainly distributed near the surface of the coating layer facing the electrode, and thus, binding force between the composite separator and the electrode may decrease.

The hot air-drying temperature in the dryer may be, for example, 30° C. to 80° C., 35° C. to 75° C., 40° C. to 70° C., or 45° C. to 65° C. By having a hot air temperature within this range, a separator having improved bending strength and peel strength at the same time may be prepared. In case the hot air-drying temperature is too low, drying may be incomplete. In case the hot air-drying temperature is too high, a uniform coating layer structure may not be obtained due to rapid volatilization of the solvent.

Retention time of the porous substrate in the dryer is, for example, 10 seconds to 50 seconds, 10 seconds to 45 seconds, 10 seconds to 40 seconds, 10 seconds to 35 seconds, or 10 seconds to 30 seconds. By having a retention time in the dryer within this range, a separator having improved bending strength and peel strength at the same time may be prepared. In case the retention time of the porous substrate in the dryer is too short, uniform phase separation may not be achieved. In case the retention time of the porous substrate in the dryer is excessively long, the base film may shrink and pores of the entire membrane may shrink.

During hot air-drying in the dryer, a non-solvent supplied into the dryer may be at least one selected from water and alcohol. The non-solvent may be, for example, water vapor. The alcohol may be, for example, methanol, ethanol, propanol, and the like.

A separator according to another embodiment includes a porous substrate; and a coating layer arranged on one surface or both surfaces of the porous substrate, wherein the coating layer includes a dried cross-linked product of the above-described composition for coating a separator.

In case the composition for coating a separator is cross-linked and dried, the coating layer comes to include inorganic particles and a binder containing a polymer in which the poly(vinylamide)-based copolymer is cross-linked, and the polymer has a form in which the cross-linking reactive group included in the poly(vinylamide)-based copolymer is cross-linked by the cross-linker.

In the separator, a thickness of the coating layer may be in a range of 5% to 50% of the thickness of the porous substrate. Specifically, for example, the thickness of the coating layer may be in a range of 10% to 40%, 15% to 35%, or 20% to 30%, with respect to a thickness of the porous substrate. By forming a coating layer in the thickness range, thermal resistance of the separator may be improved to a desired level.

A separator including a coating layer formed from the above-described composition for coating a separator may have very good physical properties such that a number of black dots per unit area (1 $m^2$) is less than 0.04. The separator may have a number of black dots per unit area (1 $m^2$) of 0.003 or less, 0.002 or less, or 0.001 or less.

An electrode assembly including the separator arranged between a positive electrode and a negative electrode, and wound into a jelly roll shape may have bending strength of 460 N or more and peel strength of 0.3 N/m or more. As the separator exhibits bending strength of 460 N or more and peel strength of 0.3 N/m or more, energy density and cycle characteristics of a lithium battery including the separator may be improved.

The porous substrate included by the separator may be a porous membrane including polyolefin. Polyolefin has an excellent effect of preventing a short circuit, and may also improve stability of a battery by a shutdown effect. For example, the porous substrate may be a porous membrane consisting of polyolefins such as polyethylene, polypropylene, polybutene, and polyvinyl chloride, and resins such as mixtures or copolymers of polyolefins, but is not necessarily limited thereto and any porous membrane used in the art may be used. For example, a porous membrane consisting of a polyolefin-based resin; a porous membrane made by weaving polyolefin-based fibers; a non-woven fabric including polyolefin; and an aggregate of insulating material particles may be used. For example, a porous membrane including polyolefin has excellent coating properties for a binder solution, which is used to prepare a coating layer formed on the porous substrate, and a thickness of the separator membrane may be reduced to increase a proportion of active materials in the battery and to increase capacity per unit volume.

The polyolefin used as a material of the porous substrate may be, for example, a homopolymer, a copolymer, or a mixture thereof of polyethylene or polypropylene. Polyethylene may be low-density, medium-density, or high-density polyethylene, and in regards to mechanical strength, high-density polyethylene may be used. In addition, two or more types of polyethylene may be mixed for a purpose of imparting flexibility. A polymerization catalyst used for preparing polyethylene is not particularly limited, and a Ziegler-Natta catalyst, a Phillips catalyst, a metallocene catalyst, or the like may be used. From a viewpoint of achieving both mechanical strength and high permeability, a weight average molecular weight of polyethylene may be 100,000 to 12,000,000, for example, 200,000 to 3,000,000. Polypropylene may be a homopolymer, a random copolymer, or a block copolymer, and may be used alone or in combination of two or more thereof. In addition, a polymerization catalyst is not particularly limited, and a Ziegler-Natta catalyst, or a metallocene catalyst may be used. In addition, stereoregularity is not particularly limited, and isotactic, syndiotactic, or atactic polypropylene may be used, but inexpensive isotactic polypropylene may be selected. In addition, polyolefin other than polyethylene or polypropylene, and additives such as antioxidants may be added to the polyolefin within a range that does not impair the effects of the present disclosure.

The porous substrate included in the separator includes, for example, polyolefin such as polyethylene and polypropylene, and a multilayer membrane of two or more layers may be used, and a mixed multilayer membrane such as a polyethylene/polypropylene two-layer separator, a polyethylene/polypropylene/polyethylene three-layer separator, and polypropylene/polyethylene/polypropylene three-layer separator may be used, but is not limited thereto, and any material and configuration that may be used as a porous substrate in the art may be used. The porous substrate included in the separator may include, for example, a diene-based polymer prepared by polymerizing a monomer composition including diene-based monomers. The diene-based monomer may be a conjugated diene-based monomer, or a non-conjugated diene-based monomer. For example, the diene monomer includes at least one selected from the group consisting of 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinylnorbornene, dicyclopentadiene, and 1,4-hexadiene, but is not necessarily limited thereto, and any that may be used as a diene-based monomer in the art may be used.

The porous substrate included in the separator may have a thickness of 1 μm to 100 μm. For example, a thickness of the porous substrate may be 1 μm to 30 μm. For example, a thickness of the porous substrate may be 5 μm to 20 μm. For example, a thickness of the porous substrate may be 5 μm to 15 μm. For example, a thickness of the porous substrate may be 5 μm to 10 μm. In case a thickness of the porous substrate is less than 1 μm, it may be difficult to maintain mechanical properties of the separator, and in case a thickness of the porous substrate is more than 100 μm, internal resistance of the lithium battery may be increased. Porosity of the porous substrate included in the separator may be 5% to 95%. In case the porosity is less than 5%, internal resistance of the lithium battery may increase, and in case the porosity is greater than 95%, it may be difficult to maintain mechanical properties of the porous substrate. A pore size of the porous substrate in the separator may be 0.01 μm to 50 μm. For example, the pore size of the porous substrate in the separator may be 0.01 μm to 20 μm. For example, the pore size of the porous substrate in the separator may be 0.01 μm to 10 μm. In case the pore size of the porous substrate is less than 0.01 μm, internal resistance of the lithium battery may be increased, and in case the pore size of the porous substrate is more than 50 μm, it may be difficult to maintain mechanical properties of the porous substrate.

A coating layer may be arranged on one surface or both surfaces of the porous substrate. The coating layer is formed from the above-described composition for coating a separator. The coating layer may have, for example, a single-layer structure or a multi-layer structure. For example, the coating layer may be arranged on only one surface of the porous substrate and may not be arranged on the other surface. Also, the coating layer may have a multilayer structure. In a multi-layered coating layer, layers selected from organic layers, inorganic layers, and organic-inorganic layers may be arbitrarily arranged. The multi-layer structure may be a two-layer structure, a three-layer structure, or a four-layer structure, but is not necessarily limited to such a structure and may be selected according to required characteristics of the composite separator. Coating layers may be, for example, arranged on both surfaces of the porous substrate. The coating layers respectively arranged on both surfaces of the porous substrate may each independently be an organic layer, an inorganic layer, or an organic-inorganic layer, and at least one thereof includes the above-described composition for coating a separator. In addition, at least one of the coating layers respectively arranged on both surfaces of the porous substrate may have a multilayer structure. In a multi-layered coating layer, layers selected from organic layers, inorganic layers, and organic-inorganic layers may be arbitrarily arranged. The multi-layer structure may be a two-layer structure, a three-layer structure, or a four-layer structure, but is not necessarily limited to such a structure and may be selected according to required characteristics of the composite separator.

The coating layer included in the separator includes, for example, 0.3 to 0.4 pores with a diameter of 500 nm to 1,000 nm per 1 μm$^2$ and 0.5 to 1.5 pores with a diameter of less than 500 nm per 1 μm$^2$. A pore with a diameter of 500 nm to 1,000 nm per 1 μm$^2$ is, for example, a large-diameter pore, and a pore with a diameter of less than 500 nm per 1 μm$^2$ is, for example, a small-diameter pore. In case a separator has a number of large-diameter pores and a number of small-diameter pores within the ranges, the composite separator may provide balanced air permeability.

In case the number of large-diameter pores included in the separator is less than 0.3 and the number of small-diameter pores is greater than 0.15, air permeability of the separator is excessively increased. Accordingly, internal resistance of the separator impregnated with a liquid electrolyte increases, and thus, cycle characteristics of a lithium battery including the separator may deteriorate. In case the number of large-diameter pores included in the separator is more than 0.4 and the number of small-diameter pores is less than 0.5, air permeability of the separator is excessively decreased. Therefore, it is difficult for the separator to suppress growth of lithium dendrites generated during charging/discharging processes, and a possibility of a short circuit or the like of the lithium battery including the separator increases. The air permeability is, for example, Gurley air permeability measured by measuring time required for 100 cc of air to pass through a separator according to JIS P-8117.

A surface of a coating layer included in a separator may have a morphology including, for example, a plurality of pores in a form of islands discontinuously arranged on a polymer membrane. The surface of the coating layer included in the separator may show a morphology in which a plurality of pores is discontinuously arranged on the polymer membrane. The surface of the coating layer is basically made of a polymer membrane, and may have a morphology in which pores are irregularly arranged in a form of islands on the polymer membrane. In case the coating layer included in the separator has such a morphology, bending strength and peel strength of the separator may be improved. As a result, energy density and cycle characteristics of a lithium battery including the separator may be improved. In contrast, a surface of a coating layer included in a separator in the art does not show a polymer membrane, and shows a morphology in which a plurality of fine particles is connected to each other to form a porous surface.

A content of inorganic particles included in the coating layer may be 98 wt % or less, 85 wt % or less, or 80 wt % or less, with respect to a total weight of the coating layer. The content of the inorganic particles included in the coating layer formed from the composition for coating a separator may be 50 wt % or more, 55 wt % or more, or 60 wt % or more, with respect to the total weight of the coating layer. The content of the inorganic particles included in the coating layer formed from the composition for coating a separator may be 55 wt % to 99 wt %, 60 wt % to 85 wt %, or 60 wt % to 80 wt %, with respect to the total weight of the coating layer. In case the coating layer formed from the composition for coating a separator includes inorganic particles within this range, bending strength and peel strength of the separator may be improved at the same time.

An average particle diameter of the inorganic particles included in the coating layer may be 50 nm to 2 μm, for example, 100 nm to 1.5 μm, or 150 nm to 1.0 μm. The average particle diameter of the inorganic particles may be measured by using, for example, a laser diffraction method or a measuring device employing a dynamic light scattering method. The average particle diameter of the inorganic particles is measured by using, for example, a laser scattering particle diameter distribution meter (for example, Horiba's LA-920), and is a value of a median particle diameter (D50) when 50% is accumulated from the side of small particles in volume conversion. Both binding force between the coating layer and the porous substrate and binding force between the coating layer and the electrode may be improved by using inorganic particles having an average particle diameter within this range. In addition, by using inorganic particles having an average particle diameter within this range, a separator including a coating layer including the inorganic particles may have appropriate porosity. In case an average particle diameter of the inorganic particles is less than 50 nm, air permeability of the separator may decrease and moisture content may increase.

Figure 2:
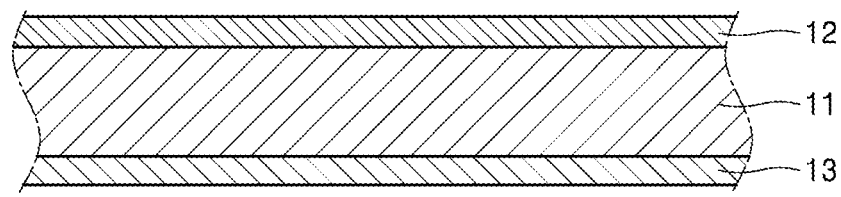
FIG. 2 is a schematic cross-sectional view of a separator according to another example embodiment.

A thickness of the coating layer may be, for example, 0.5 μm to 4 μm, for example, 0.5 μm to 3.0 μm, or 0.5 μm to 2.0 μm per surface. In case the thickness of the coating layer per surface is too great, a volume of the wound electrode assembly may increase. In case the thickness of the coating layer per surface is too small, improved bending strength and peel strength may not be obtained. By arranging coating layers on one surface or both surfaces of the porous substrate, binding force between the coating layers and the electrode is further improved, and as a result, volume change during charging and discharging of the lithium battery may be suppressed. For example, referring to FIGS. 1 and 2, a coating layer 12 may be arranged on one surface of the porous substrate 11, or coating layers 12 and 13 may be respectively arranged on both surfaces of a porous substrate 11, in a separator.

Porosity of the coating layer may be 30% to 90%, 35% to 80%, or 40% to 70%. In case the coating layer has porosity within this range, an increase in internal resistance of the separator may be prevented, and excellent membrane strength may be provided while having excellent high-rate characteristics. The porosity of the coating layer is a volume occupied by pores in the total volume of the coating layer.

An application amount of the coating layer may be, for example, 1.0 g/m² to 4.5 g/m², 1.2 g/m² to 4.5 g/m², 1.5 g/m² to 4.5 g/m², or 1.7 g/m² to 4.5 g/m². In case the application amount of the coating layer is within this range, the separator including the coating layer may simultaneously provide improved thermal resistance, peel strength, and bending strength. In case the application amount of the coating layer is too small, improved bending strength and peel strength may not be obtained.

A binder included in the coating layer may not have a concentration gradient in which a concentration of the binder increases in a direction from an interface in contact with a porous substrate of the porous layer to a surface facing the electrode. For example, the binder may have a concentration gradient in which a concentration of the binder reduces from an interface in contact with the porous substrate of the porous layer to the surface facing the electrode, or a concentration gradient with no tendency to change in concentration.

A lithium battery according to another embodiment includes a positive electrode, a negative electrode, and the above-described separator arranged between the positive electrode and the negative electrode. According to an example, the lithium battery includes an electrode assembly including a positive electrode, a negative electrode, and the above-described separator arranged between the positive electrode and the negative electrode, and the electrode assembly may have a form wound into a jelly roll shape. In case the lithium battery includes the above-described separator, stability of the lithium battery may be improved by increasing heat resistance of the separator.

A lithium battery may be prepared, for example, in the following way.

First, a negative electrode composition is prepared by mixing a negative active material, a conductive material, a binder, and a solvent. The negative active material composition may be directly coated on a metal current collector to prepare a negative electrode plate. Alternatively, the negative active material composition may be cast on a separate support and then a film separated from the support may be laminated on a metal current collector to prepare a negative electrode plate. The negative electrode is not limited to the above-described forms, but may have a form other than the forms.

The negative active material may be a carbon-based material. For example, the carbon-based material may be crystalline carbon, amorphous carbon, or a mixture thereof. The crystalline carbon may be graphite such as non-shaped, plate-like, flake-like, spherical, or fibrous natural graphite, or artificial graphite, and the amorphous carbon may be soft carbon (low-temperature calcined carbon), or hard carbon, mesophase pitch carbide, calcined coke, and the like.

In addition, a composite of a carbon-based material and a non-carbon-based material may also be used as the negative electrode active material, and a negative active material may additionally include a non-carbon-based material in addition to the carbon-based material.

For example, the negative active material may include at least one selected from the group consisting of, for example, a metal capable of forming an alloy with lithium, an alloy of a metal capable of forming an alloy with lithium, and an oxide of a metal capable of forming an alloy with lithium.

For example, the metals alloyable with lithium may be Si, Sn, Al, Ge, Pb, Bi, Sb, and Si—Y alloy (Y may be an alkali metal, alkaline earth metal, group 13 to 16 element, transition metal, rare earth element, or a combination thereof, and is not Si), Sn—Y alloy (Y may be an alkali metal, alkaline earth metal, group 13 to 16 element, transition metal, rare earth element, or a combination thereof, and is not Sn), and the like. The element Y may be, for example, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, or lithium vanadium oxide.

For example, the non-transition metal oxide may be $SnO_2$, $SiO_x$ ($0<x<2$), etc.

Specifically, the non-carbon-based material may be at least one selected from the group consisting of Si, Sn, Pb, Ge, Al, SiOx ($0<x\leq2$), SnOy ($0<y\leq2$), $Li_4Ti_5O_{12}$, $TiO_2$, $LiTiO_3$, $Li_2Ti_3O_7$, but is not limited thereto, and any non-carbon-based negative active material used in the art may be used.

As a conductive material, acetylene black, Ketjenblack™, natural graphite, artificial graphite, carbon black, acetylene black, carbon fiber, metal powder such as copper, nickel, aluminum, or silver may be used, and one kind, or a mixture of one or more kinds of conductive materials such as polyphenylene derivatives may be used, but it is not limited thereto, and any material that may be used as a conductive material in the art may be used. In addition, the above-described crystalline carbon-based material may be added as a conductive material.

Examples of the binder include vinylidene fluoride/hexafluoropropylene copolymer, polyvinylidene fluoride (PVDF), polyacrylonitrile, polymethylmethacrylate, polytetrafluoroethylene (PTFE), mixtures thereof, or styrene butadiene rubber-based polymer or the like, but it is not necessarily limited thereto, and any binder used in the art may be used.

N-methylpyrrolidone, acetone, or water may be used as the solvent, but the solvent is not limited thereto, and any solvent that may be used in the art may be used.

Contents of the negative active material, conductive material, binder, and solvent are levels commonly used in lithium batteries. Depending on a use and configuration of the lithium battery, one or more of the conductive material, binder, and solvent may be omitted.

Meanwhile, the binder used for preparing the negative electrode may be the same as the composition for coating a separator included in the coating layer of the separator.

Next, a positive electrode composition is prepared by mixing a positive active material, a conductive material, a binder, and a solvent. The positive active material composition may be directly coated on a metal current collector to prepare a positive electrode plate. Alternatively, the positive active material composition may be cast on a separate support and then a film separated from the support may be laminated on a metal current collector to prepare a positive electrode plate.

At least one selected from lithium cobalt oxide, lithium nickel cobalt manganese oxide, lithium nickel cobalt aluminum oxide, lithium iron phosphate, and lithium manganese oxide may be included as a positive active material, but the positive active material is not limited thereto, and all that may be used as a positive active material in the art may be used.

For example, a compound represented by any one of the following formulas may be used: $Li_aA_{1-b}B_bD_2$ (wherein $0.90 \leq a \leq 1.8$, and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB_cO_{2-\alpha}F^\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co^bB_cO_{2-\alpha}F_2$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}MnB_cO_{2-\alpha}F_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 \leq \alpha \leq 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$.); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In these formulas, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

A compound with a coating layer on a surface of the above-mentioned compound may be used, or a mixture of the above-mentioned compound and the compound with a coating layer may be used. The coating layer may include a compound of a coating element, such as an oxide of a coating element, a hydroxide of a coating element, an oxyhydroxide of a coating element, an oxycarbonate of a coating element, or a hydroxycarbonate of a coating element. Compounds constituting the coating layer may be amorphous or crystalline. As the coating element included in the coating layer, Mg, Al, Co, K, Na, Ca, Si, Ti, V, Sn, Ge, Ga, B, As, Zr, or mixtures thereof may be used. In a process of forming the coating layer, any coating method (for example, spray coating, an immersion method, etc.) may be used as long as the compound may be coated in a way that does not adversely affect physical properties of the positive active material by using these elements, and since this may be well understood by those skilled in the art, a detailed description thereof will be omitted.

For example, $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≤x≤0.5, and 0≤y≤0.5), $LiFeO_2$, $V_2O_5$, TiS, MoS, and the like may be used.

In the positive active material composition, the conductive material, the binder, and the solvent may be the same as those in the negative active material composition. Meanwhile, it is also possible to form pores inside the electrode plate by adding a plasticizer to the positive active material composition and the negative active material composition.

Contents of the positive active material, conductive material, general binder, and solvent are levels commonly used in lithium batteries. Depending on an intended use and configuration of the lithium battery, one or more of the conductive material, binder, and solvent may be omitted.

Meanwhile, the binder used for preparing the positive electrode may be the same as the composition for coating a separator included in the coating layer of the separator.

Next, the above-described separator is inserted between the positive electrode and the negative electrode.

In an electrode assembly including a positive electrode/separator/negative electrode, the separator arranged between the positive electrode and the negative electrode includes a porous substrate; and a coating layer arranged on both surfaces of the porous substrate, as described above, wherein the coating layer includes dried cross-linked product of the above-described composition for coating a separator.

A separator may be separately prepared and arranged between the positive electrode and the negative electrode. Alternatively, the separator may be prepared by: winding the electrode assembly including the positive electrode/separator/negative electrode into a jelly roll shape, then accommodating the jelly roll in a battery case or pouch; precharging the jelly roll accommodated in a battery case or pouch while thermally softening the jelly roll under pressure; hot rolling the charged jelly roll; cold rolling the filled jelly roll; and going through a formation process of charging and discharging the charged jelly roll under pressure.

Next, an electrolyte is prepared.

The electrolyte may be in a liquid or gel state.

For example, the electrolyte may be an organic liquid electrolyte. Also, the electrolyte may be solid. The electrolyte may be, for example, a boron oxide, lithium oxynitride, and the like, but is not limited thereto, and all that may be used as a solid electrolyte in the related art may be used. The solid electrolyte may be formed on the negative electrode by a method such as sputtering.

For example, an organic liquid electrolyte may be prepared. The organic liquid electrolyte may be prepared by dissolving a lithium salt in an organic solvent.

For the organic solvent, all that may be used as an organic solvent in the art may be used. The organic solvent may include, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, methyl propionate, ethyl propionate, propyl propionate, benzonitrile, acetonitrile, tetrahydrofuran, 2-methyltetrahydrofuran, γ-butyrolactone, dioxolane, 4-methyldi Oxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, mixtures thereof, or the like.

For the lithium salt, all that may be used as a lithium salt in the art may be used. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are natural numbers), LiCl, LiI, or a mixture thereof.

Figure 3:
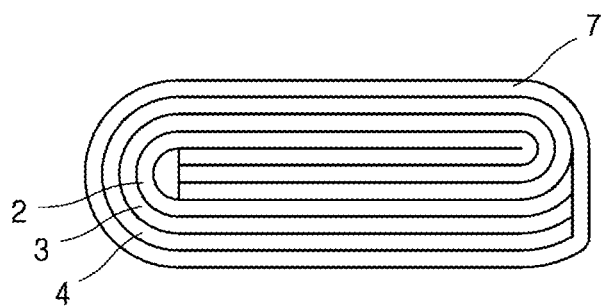
FIG. 3 is a schematic diagram of a lithium battery including an electrode assembly wound into a flat jelly roll shape, according to an example embodiment.

As shown in FIG. 3, the lithium battery 1 includes a positive electrode 3, a negative electrode 2, and a composite separator 4. After the positive electrode 3, the negative electrode 2, and the separator 4 are wound into an electrode assembly in a flat jelly roll shape, the electrode assembly is accommodated in a pouch 7. Then, an organic liquid electrolyte is injected into the pouch 7 and the pouch is sealed to complete the lithium battery 1.

Figure 4:
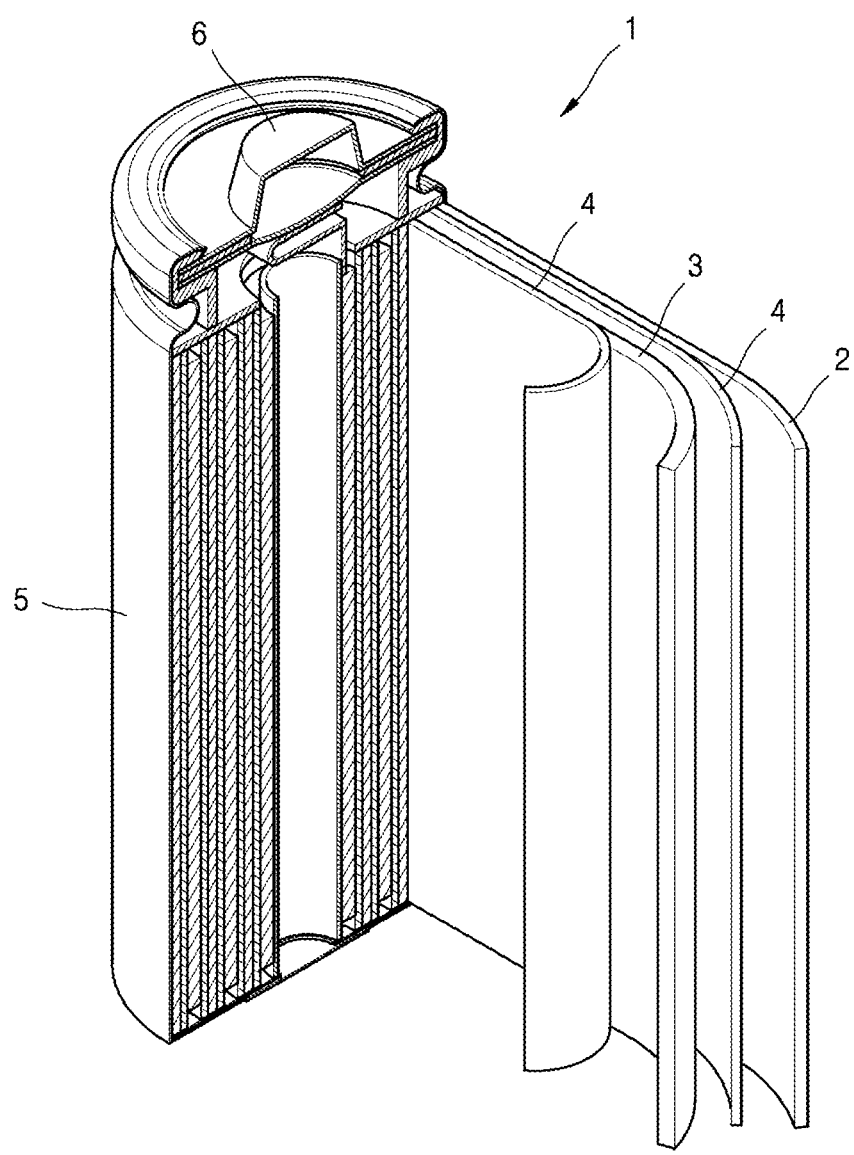
FIG. 4 is a schematic diagram of a lithium battery including an electrode assembly wound into a cylindrical jelly roll shape, according to an example embodiment.

As shown in FIG. 4, the lithium battery 1 includes a positive electrode 3, a negative electrode 2, and a separator 4. After the positive electrode 3, the negative electrode 2, and the separator 4 are wound into an electrode assembly in a cylindrical jelly roll shape, the electrode assembly is accommodated in a battery case 5. Subsequently, an organic liquid electrolyte is injected into the battery case 5 and the battery case is sealed with a cap assembly 6 to complete a lithium battery 1. The battery case may be a cylindrical shape, a prismatic shape, or a thin film type. The lithium battery may be a lithium ion battery. The lithium battery may be a lithium polymer battery.

Since the lithium battery is excellent in high-rate characteristics and lifespan characteristics, the lithium battery is suitable to be used in electrical vehicles (EV). For example, the lithium battery may be suitable for a hybrid vehicle such as a plug-in hybrid electric vehicle (PHEV).

MODE OF DISCLOSURE

The present inventive concept is explained in more detail through the following examples and comparative examples. However, the examples are for exemplifying the present inventive concept, and the scope of the present inventive concept is not limited thereto.

Preparation of Separator

Example 1: Application of Aqueous Cross-Linking Binder (Acrylic Acid 10 Mol %), Thickness of Coating Layer 2 μm A coating solution was prepared by mixing 9.52 wt % of boehmite (ACTILOX 200SM, Nabaltec) with an average particle diameter (D50 by volume) of 0.3 μm, 0.30 wt % of a cross-linking reactive polyvinylpyrrolidone-acrylic acid copolymer (Mw 300,000), in which a content of acrylic acid monomers is 10 mol %, with respect to the total moles of the monomer components constituting the copolymer, 0.03 wt % of ethylene glycol diglycidyl ether as a binder, 0.14 wt % of PVA (Daejeong Chemical, Mw 22,000), and 90.01 wt % of DI water.

The coating solution was coated on a cross-section of a 8 μm thick polyethylene porous substrate (CZMZ, NW05535) by a bar coating method, and then dried under conditions of a temperature of 80° C. and wind velocity of 15 m/see to form a 2 μm thick coating layer, and a coated separator having a total thickness of 10 μm was prepared.

Example 2: Application of Aqueous Cross-Linking Binder (Acrylic Acid 30 Mol %), Thickness of Coating Layer 2 μm A coating solution was prepared by mixing 9.52 wt % of boehmite (ACTILOX 200SM, Nabaltec) with an average particle diameter (D50 by volume) of 0.3 μm, 0.30 wt % of a cross-linking reactive polyvinylpyrrolidone-acrylic acid copolymer (Mw 300,000), in which a content of acrylic acid monomers is 30 mol %, with respect to the total moles of the monomer components constituting the copolymer, 0.03 wt % of ethylene glycol diglycidyl ether as a binder, 0.14 wt % of PVA (Daejeong Chemical, Mw 22,000), and 90.01 wt % of DI water.

The coating solution was coated on a cross-section of a 8 μm thick polyethylene porous substrate (CZMZ, NW05535) to form a 2 μm thick coating layer, and a coated separator having a total thickness of 10 μm was prepared.

Comparative Example 1: Non-Cross-Linking CMS Binder Applied, Thickness of Coating Layer 2 μm A coating solution was prepared by mixing 9.52 wt % of boehmite (ACTILOX 200SM, Nabaltec) with D50 of 0.3 μm, 0.33 wt % of carboxymethylcellulose (CMC) sodium salt (medium viscosity, Sigma Aldrich), 0.14 wt % of PVA (Daejeong Chemical, Mw 22,000), and 90.01 wt % of DI water.

The coating solution was coated on a cross-section of a 8 μm thick polyethylene porous substrate (CZMZ, NW05535) to form a 2 μm thick coating layer, and a coated separator having a total thickness of 10 μm was prepared.

Comparative Example 2: Non-Cross-Linking CMS Binder Applied, Thickness of Coating Layer 3 μm A coating solution was prepared by mixing 9.52 wt % of boehmite (ACTILOX 200SM, Nabaltec) with D50 of 0.3 μm, 0.33 wt % of carboxymethylcellulose (CMC) sodium salt (medium viscosity, Sigma Aldrich), 0.14 wt % of PVA (Daejeong Chemical, Mw 22,000), and 90.01 wt % of DI water.

The coating solution was coated on a cross-section of a 8 μm thick polyethylene porous substrate (CZMZ, NW05535) to form a 3 μm thick coating layer, and a coated separator having a total thickness of 11 μm was prepared.

Comparative Example 3: Non-Cross-Linking CMS Binder Applied, Thickness of Coating Layer 4 μm A coating solution was prepared by mixing 9.52 wt % of boehmite (ACTILOX 200SM, Nabaltec) with D50 of 0.3 μm, 0.33 wt % of carboxymethylcellulose (CMC) sodium salt (medium viscosity, Sigma Aldrich), 0.14 wt % of PVA (Daejeong Chemical, Mw 22,000), and 90.01 wt % of DI water.

The coating solution was coated on a cross-section of a 8 μm thick polyethylene porous substrate (CZMZ, NW05535) to form a 4 μm thick coating layer, and a coated separator having a total thickness of 12 μm was prepared.

Comparative Example 4: Removal of Cross-Linker from Binder of Example 1

A coating solution was prepared by mixing 9.52 wt % of boehmite (ACTILOX 200SM, Nabaltec) with D50 of 0.3 μm, 0.33 wt % of a cross-linking reactive polyvinylpyrrolidone-acrylic acid copolymer (Mw 300,000), in which a content of acrylic acid monomers is 10 mol %, with respect to the total moles of the monomer components constituting the copolymer, 0.14 wt % of PVA (Daejeong Chemical, Mw 22,000), and 90.01 wt % of DI water.

The coating solution was coated on a cross-section of a 8 μm thick polyethylene porous substrate (CZMZ, NW05535) to form a 2 μm thick coating layer, and a coated separator having a total thickness of 10 μm was prepared.

Comparative Example 5: Application of Aqueous Cross-Linking Binder (Acrylic Acid 10 Mol %), Thickness of Coating Layer 2 μm A coating solution was prepared by mixing 9.52 wt % of boehmite (ACTILOX 200SM, Nabaltec) with D50 of 0.3 μm, 0.30 wt % of polyvinylpyrrolidone not including acrylic acid (Mw 300,000), 0.03 wt % of ethylene glycol diglycidyl ether as a binder, 0.14 wt % of PVA (Daejeong Chemical, Mw 22,000), and 90.01 wt % of DI water.

The coating solution was coated on a cross-section of a 8 μm thick polyethylene porous substrate (CZMZ, NW05535) to form a 2 μm thick coating layer, and a coated separator having a total thickness of 10 μm was prepared.

Comparative Example 6: Application of Aqueous Cross-Linking Binder (Acrylic Acid 50 Mol %)

A coating solution was prepared by mixing 9.52 wt % of boehmite (ACTILOX 200SM, Nabaltec) with D50 of 0.3 μm, 0.30 wt % of a cross-linking reactive polyvinylpyrrolidone-acrylic acid copolymer (Mw 300,000), in which a content of acrylic acid monomers is 50 mol %, with respect to the total moles of the monomer components constituting the copolymer, 0.30 wt % of ethylene glycol diglycidyl ether as a binder, 0.14 wt % of PVA (Daejeong Chemical, Mw 22,000), and 90.01 wt % of DI water.

However, for a polyvinylpyrrolidone-based binder containing 50 mol % of acrylic acid, dispersion stability of the coating solution was lowered due to an increase in cross-linking reactivity, which made it difficult to proceed with coating, and eventually a coated separator could not be prepared.

Evaluation Example 1: Evaluation of High Temperature Thermal Shrinkage Rate Characteristics A method of measuring a thermal shrinkage rate of a separator is not particularly limited, and a method commonly used in the technical field of the present disclosure may be used. A non-limiting example of a method of measuring a thermal shrinkage rate of a separator is as follows:

the separators prepared in Examples 1 and 2, and Comparative Examples 1 to 4 were each cut to a size of about 10 cm in width (machine direction: MD) and about 10 cm in length (transverse Direction: TD); the cut separators were stored in a chamber at 150° C. for 1 hour; degrees of shrinkage of the separators in MD and TD were measured, and an MD thermal shrinkage rate and a TD thermal shrinkage rate were calculated by Equations 1 and 2 below, and between the MD thermal shrinkage rate and the TD thermal shrinkage rate, a higher value was calculated as the final value and shown in Table 1 below.

$$MD \text{ thermal shrinkage rate} = \qquad \text{<Equation 1>}$$
$$(\text{length reduced in MD after high temperature shrinkage evaluation/length of separator in MD before evaluation}) \times 100$$

$$TD \text{ thermal shrinkage rate} = \qquad \text{<Equation 2>}$$
$$(\text{length reduced in TD after high temperature shrinkage evaluation/length of separator in TD before evaluation}) \times 100$$

The values calculated by Equations 1 and 2 are shown in Table 1 below.

Evaluation Example 2: Evaluation of for Example, Thermal Shrinkage

The separators prepared in Examples 1 and 2, and Comparative Examples 1 to 5 were each cut to a size of about 10 cm in width (MD) and about 10 cm in length (TD); the cut separators were impregnated in propylene carbonate (PC) liquid electrolyte in which 1M of $LiBF_4$ is dissolved stored, stored in a chamber at 150° C. for 10 minutes. Subsequently, as in Evaluation Example 1, the MD thermal shrinkage rate and the TD thermal shrinkage rate were calculated, respectively, and the calculated values are shown in Table 1 below.

Evaluation Example 3: Evaluation of Moisture Properties

Moisture contents of the separators prepared in Examples 1 and 2, and Comparative Examples 1 to 5 were measured according to the Karl-Fischer measurement method, and the results are shown in Table 1 below. The moisture contents were measured under conditions of 85° C. and 12 hours.

TABLE 1

| | Thermal shrinkage rate (150° C., 60 minutes) MD (%) | Liquid electrolyte impregnation thermal shrinkage rate (PC, 1M $LiBF_4$, 150° C., 10 minutes) TD (%) | Moisture content (85° C., 12 hours, ppm) MD (%) | TD (%) | |
|---|---|---|---|---|---|
| Example 1 | 2 | 2 | 9 | 7 | 537 |
| Example 2 | 1 | 2 | 7 | 6 | 515 |
| Comparative Example 1 | ≥30 | ≥30 | ≥70 | ≥70 | 931 |
| Comparative Example 2 | 4 | 5 | ≥70 | ≥70 | 1,078 |
| Comparative Example 3 | 4 | 4 | ≥50 | ≥50 | 1,250 |
| Comparative Example 4 | 16 | 17 | ≥70 | ≥70 | 945 |
| Comparative Example 5 | 20 | 19 | ≥70 | ≥70 | 1,119 |

As shown in Table 1, in the separator according to an example, as a content of acrylic acid in the copolymer increased, both characteristics of thermal shrinkage at 150° C. and liquid electrolyte impregnation thermal shrinkage were improved without an increase in moisture content. On the other hand, as shown in Comparative Example 6, for a polyvinylpyrrolidone-based copolymer having an acrylic acid content of 50 mol % or more, dispersion stability of the coating solution was lowered due to an increase of cross-linking reactivity, making it difficult to proceed with coating. Therefore, in case the acrylic acid content is 50 mol % or more, it is impossible to prepare a coated separator due to a decrease in storage stability.

Comparative Examples 1 to 3 used a CMC binder in the art, instead of a cross-linking binder, and as a result of measuring physical properties for each coating thickness, as shown in Table 1, as the coating thickness increased, thermal shrinkage characteristics at 150° C. were improved, but there was no improvement effect of liquid electrolyte impregnation thermal shrinkage characteristics.

Comparative Example 4 is the same as Example 1, but coated without a cross-linking agent, and it may be seen that thermal resistance is reduced due to an increase in the moisture content and thermal shrinkage rate at 150° C., and also due to the greatly increased liquid electrolyte impregnation thermal shrinkage rate.

Comparative Example 5 is the same as Example 1, but uses a polyvinylpyrrolidone-based polymer having no cross-linking reactivity for not containing acrylic acid, and Comparative Example 5 compared to Example 1 has an increased moisture content and significantly decreased thermal resistance.

Through this, it was confirmed that high-temperature thermal resistance characteristics of a separator may be improved by coating the separator by using the cross-linking reactive poly(vinylamide)-based copolymer.

Hitherto embodiments have been described with reference to drawings and examples, but these are only illustrative, and those skilled in the art will be able to understand that various modifications and equivalent other embodiments are possible therefrom. Therefore, the scope of the present disclosure should be defined by the appended claims.

EXPLANATION OF REFERENCE NUMERALS

11 Porous substrate; 12, 13 Coating layer;
1 Lithium battery; 2 Negative electrode;
3 Positive electrode; 4 Separator;
5 Battery case; 6 Cap assembly;
7 Pouch

INDUSTRIAL APPLICABILITY

A composition for coating a separator according to an aspect may produce a separator having high thermal resistance.

The invention claimed is:

1. A composition for coating a separator, comprising:
   a binder having an aqueous cross-linking reactive poly (vinylamide)-based copolymer;
   a cross-linker;
   inorganic particles; and
   water,
   wherein:
   the poly (vinylamide)-based copolymer includes a repeating unit derived from a vinylamide monomer and a repeating unit derived from a cross-linking reactive group-containing monomer,
   the vinylamide monomer is selected from vinylpyrrolidone, vinylcaprolactam and mixtures thereof, the crosslinking reactive group includes at least one selected from a carboxyl group, an isocyanate group, a hydroxyl group, and an oxazoline group, and the cross-linker includes at least one of ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol trimethylolpropane, pentaerythricol, and sorbitol.

2. The composition for coating a separator as claimed in claim 1, wherein a content of the poly (vinylamide)-based copolymer is 10 wt % to 100 wt %, with respect to a total weight of the binder.

3. The composition for coating a separator as claimed in claim 1, wherein a content of the cross-linker is in a range of 1 part by weight to 45 parts by weight, with respect to 100 parts by weight of the poly (vinylamide)-based copolymer.

4. The composition for coating a separator as claimed in claim 1, wherein the inorganic particles include at least one of boehmite, alumina, aluminum oxyhydroxide (AlOOH), zirconia, yttria, ceria, magnesia, titania, silica, aluminum carbide, titanium carbide, tungsten carbide, boron nitride, aluminum nitride. calcium carbonate, barium sulfate, aluminum hydroxide, and magnesium hydroxide.

5. The composition for coating a separator as claimed in claim 1, wherein a weight ratio of a total weight of the binder to a weight of the inorganic particles is 0.1:99.9 to 50:50.

6. The composition for coating a separator as claimed in claim 1, wherein the poly (vinylamide)-based copolymer includes a repeating unit derived from a vinylamide monomer and a repeating unit derived from a crosslinking reactive group-containing monomer, and the repeating unit derived from a vinylamide monomer includes a repeating unit derived from vinylpyrrolidone and the repeating unit derived from a crosslinking reactive group-containing monomer includes a repeating unit derived from (meth) acrylic acid.

7. The composition for coating a separator as claimed in claim 1, wherein, in the poly (vinylamide)-based copolymer, a content of the repeating unit derived from a cross-linking reactive group-containing monomer is more than 0 mol % and less than 50 mol %, with respect to the total moles of monomer components constituting the poly (vinylamide)-based copolymer.

8. The composition for coating a separator as claimed in claim 1, wherein in the poly (vinylamide)-based copolymer, a content of the repeating unit derived from a cross-linking reactive group-containing monomer is 1 mol % to 45 mol %, with respect to the total moles of monomer components constituting the poly (vinylamide)-based copolymer.

9. The separator coating composition as claimed in claim 1, wherein the crosslinking reactive group includes at least one selected from an isocyanate group, a hydroxyl group, and an oxazoline group.

10. The composition for coating a separator as claimed in claim 1, wherein the monomer containing the cross-linking reactive group is a monomer containing a carboxyl group.

11. The composition for coating a separator as claimed in claim 10, wherein the carboxyl group includes at least one of acrylic acid, methacrylic acid, carboxyethyl acrylate, carboxypentyl acrylate, itaconic acid, maleic acid, fumaric acid, crotonic acid, and isocrotonic acid; monovalent metal salts, divalent metal salts, ammonium salts and organic amine salts thereof; and mixtures thereof.

12. A separator, comprising:
a porous substrate; and
a coating layer on one surface or both surfaces of the porous substrate, the coating layer being a dried cross-linked product of a composition, the composition including:
a binder having an aqueous cross-linking reactive poly (vinylamide)-based copolymer;
a cross-linker;
inorganic particles; and
water,
wherein:
the poly (vinylamide)-based copolymer including a repeating unit derived from a vinylamide monomer and a repeating unit derived from a cross-linking reactive group-containing monomer,
the vinylamide monomer is selected from vinylpyrrolidone, vinylcaprolactam and mixtures thereof,
the crosslinking reactive group includes at least one selected from a carboxyl group, an isocyanate group, a hydroxyl group, and an oxazoline group, and
the cross-linker includes at least one of ethylene glycol, diethylene glycol, propylene glycol, triethylene glycol, tetraethylene glycol, propanediol, dipropylene glycol, polypropylene glycol, glycerin, polyglycerin, butanediol, heptanediol, hexanediol trimethylolpropane, pentaerythricol, and sorbitol.

13. The separator as claimed in claim 12, wherein the poly (vinylamide)-based copolymer is cross-linked, and the polymer has a form in which the cross-linking reactive group included in the poly (vinylamide)-based copolymer is cross-linked by the cross-linker.

14. The separator as claimed in claim 12, wherein a thickness of the coating layer is 5% to 50% of a thickness of the porous substrate.

15. The separator coating composition as claimed in claim 12, wherein the crosslinking reactive group includes at least one selected from an isocyanate group, a hydroxyl group, and an oxazoline group.

16. A lithium battery, comprising the separator according to claim 12.

17. The lithium battery as claimed in claim 16, wherein the poly (vinylamide)-based copolymer is cross-linked, and the polymer has a form in which the cross-linking reactive group included in the poly (vinylamide)-based copolymer is cross-linked by the cross-linker.

* * * * *